United States Patent
Weigelt

(10) Patent No.: US 8,404,006 B2
(45) Date of Patent: Mar. 26, 2013

(54) SELF-PROPELLED HARVESTING VEHICLE INCLUDING A THERMOCHEMICAL REACTOR FOR CARBONIZING HARVESTED CROP MATERIAL

(75) Inventor: Horst Weigelt, Gueterslohl (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/330,020

(22) Filed: Dec. 19, 2011

(65) Prior Publication Data

US 2012/0102903 A1      May 3, 2012

Related U.S. Application Data

(63) Continuation-in-part of application No. 12/485,474, filed on Jun. 16, 2009.

(30) Foreign Application Priority Data

Jun. 19, 2008   (DE) .................. 10 2008 028 859

(51) Int. Cl.
   *C10L 5/40*   (2006.01)
(52) U.S. Cl. ............ 44/589; 44/550; 44/590; 56/1
(58) Field of Classification Search .......... 44/605, 44/553, 547, 563, 590, 589, 550; 435/165, 435/134, 167, 160, 166, 72, 209, 289.1, 162, 435/243; 127/27, 1, 37; 100/38, 190, 305, 100/906; 202/83, 117, 217, 218, 222; 422/209, 422/210, 198; 56/1, 16.4 B
See application file for complete search history.

(56) References Cited

U.S. PATENT DOCUMENTS

| | | | |
|---|---|---|---|
| 3,352,229 A | 11/1967 | Morse | |
| 3,559,566 A | 2/1971 | Aspegren | |
| 3,593,429 A | 7/1971 | Thompson | |
| 4,446,678 A | 5/1984 | Smith | |
| 4,529,407 A | 7/1985 | Johnston et al. | |
| 4,702,746 A | 10/1987 | Finch | |
| 4,995,972 A | 2/1991 | Kramer et al. | |
| 7,744,671 B1 * | 6/2010 | Ouellette | 71/9 |
| 7,942,942 B2 * | 5/2011 | Paoluccio | 44/605 |
| 2001/0002037 A1 | 5/2001 | Cullinger | |
| 2006/0130396 A1 | 6/2006 | Werner | |
| 2009/0019826 A1 | 1/2009 | Rigney | |
| 2009/0036184 A1 | 2/2009 | Craessaerts et al. | |
| 2009/0113867 A1 | 5/2009 | Birrell et al. | |
| 2009/0241944 A1 | 10/2009 | Cullinger | |
| 2010/0041119 A1 * | 2/2010 | Christensen et al. | 435/162 |
| 2010/0319424 A1 | 12/2010 | Wietgrefe | |

FOREIGN PATENT DOCUMENTS

DE    10 2004 003 011    8/2005

* cited by examiner

*Primary Examiner* — Árpád Fábián-Kovács
(74) *Attorney, Agent, or Firm* — Michael J. Striker

(57) ABSTRACT

A self-propelled harvesting vehicle includes a crop material pick-up device, a fragmentation unit for fragmentizing the crop material, and a mechanical dehydration device which is used to remove an aqueous portion of the crop material, and which is divided into a first dehydration unit that takes place upstream of the fragmentation unit, and a second dehydration unit that takes place downstream of the fragmentation unit; and a method of harvesting is performed by the thusly arranged units.

24 Claims, 2 Drawing Sheets

US 8,404,006 B2

SELF-PROPELLED HARVESTING VEHICLE INCLUDING A THERMOCHEMICAL REACTOR FOR CARBONIZING HARVESTED CROP MATERIAL

CROSS-REFERENCE TO RELATED APPLICATION

The present application is a continuation-in-part of U.S. patent application Ser. No. 12/485,474 filed on Jun. 16, 2009. This U.S. patent application has a subject matter which is incorporated herein by reference and provides the basis for a claim of priority of invention under 35 USC 119(a)-(d).

The invention described and claimed hereinbelow is also described in German Patent Application DE 10 2008 028 859.4 filed on Jun. 19, 2008. This German Patent Application, whose subject matter is incorporated here by reference, provides the basis for a claim of priority of invention under 35 U.S.C. 119(a)-(d).

BACKGROUND OF THE INVENTION

The present invention relates to a self-propelled harvesting machine that is especially adapted for the harvesting of crop material to be used for technical purposes, in particular for energy-related purposes.

The present invention also relates to a method of harvesting of crop material with a self-propelled harvesting machine, to be used for technical purposes, in particular, for energy related purposes.

Due to rapidly increasing costs for fossil fuels, techniques for obtaining fuel from sustainable raw materials have recently become the focus of greater public interest.

One problem that exists with most of the techniques used to obtain fuel from biomass is the high water content of the biomass in its fresh state. When fresh biomass must be hauled to a stationary facility where it is processed into fuel, large quantities of water that are present in the biomass are also transported, thereby resulting in high transport costs and, ultimately; high energy expenditures. If this factor is added to the energy "balance sheet" for a fuel obtained from biomass, the result is low efficiency, and even negative efficiency in certain circumstances. Therefore, it is important to minimize the distances covered between the field and the processing facility, and to minimize the amount of mass that is hauled.

To reach this goal, DE 10 2004 003 011 A1 provides that the processing system be brought to the crop material on the field, as part of a self-propelled harvesting machine, and that the crop material be processed into fuel directly on the field. This known harvesting machine includes a processing module for fragmentizing and compressing the harvested biomass, thereby separating the harvested biomass into a solid portion and a portion composed of plant juices. The portion of solid material obtained in this manner is then dried, in order to reduce its water content to the extent that the material may be processed further in an oiling module to obtain gasoline, Diesel oil, and heavy oil. In order to process the harvested biomass into fuel during the harvesting process itself, the processes mentioned must take place quickly, which, in the case of drying in particular, is not possible without the addition of a considerable amount of energy from an external source. Since the energy used in this case for drying also reduces the efficiency of the entire process to a considerable extent, it is important to remove so much moisture from the biomass by mechanical means that the drying may take place using a minimal amount of energy, or so that the drying unit and step may be eliminated entirely.

SUMMARY OF THE INVENTION

It is therefore an object of present invention to provide a self-propelled harvesting vehicle for crop material for technical use and a method of harvesting of crop material with a self-propelled harvesting vehicle, which avoids the disadvantages of the prior art.

In keeping with these objects and with others which will become apparent hereinafter, one feature of the present invention resides, briefly stated, in a self-propelled harvesting vehicle, comprising a crop material pick-up device; a fragmentation means for fragmenting the crop material: and a mechanical dehydration device for removing an aqueous portion of the crop material, which mechanical dehydration device includes a first dehydration means that is located upstream of the fragmentation means, and a second dehydration means that is located downstream of the fragmentation means.

Another feature of the present invention resides, briefly stated, in a method of harvesting a crop material with a self-propelled harvesting vehicle, comprising the steps of picking-up a crop material with a pick-up device; fragmenting the crop material with a fragmentation means; and removing an aqueous portion of the crop material with a mechanical dehydration device including a first dehydration means located upstream of the fragmentation means and a second dehydration means located downstream of the fragmentation means.

Given that the water that is weakly bound in the cellular structure of the harvested plant material is removed in the first dehydration means (step), and the plant material is then fragmentized, a material is obtained that has a cellular structure that has been weakened due to the removal of water which took place in the initial dehydration means (step). Water that is released from the plant cells in the second dehydration means (step) may enter the open spaces—which were created in this manner—in the cellular structure relatively easily up to an interface with the particular piece of plant material, and then exit the remaining solid material. Given that the first mechanical dehydration step and the fragmentation process open up the biomass in this manner for the subsequent, second dehydration step, it is possible to obtain a dehydrated biomass having a particularly low content of residual water in a short period of time and using very little drive energy from fresh biomass. The first dehydration means preferably utilizes at least one pair of compression rollers which forms compression gap through which the harvested biomass passes.

The second dehydration means, in which the fragmentized biomass is dehydrated further, preferably utilizes a decanter or a screw extruder, both of which are suited for use to rapidly process large quantities of fragmentized material.

A heating device may be provided in order to heat the biomass that passes through the second dehydration means (step). The heating opens up the cellular structure of the material further, thereby further facilitating the dehydration process. Since this heating means (step) is only used to further open up the cells of the biomass, but not to evaporate the moisture that remains, the output required of the heating device is minimal compared to the heat output that would be required to dry the biomass using the conventional method.

The dehydration device and the fragmentation means (step) are preferably designed or may be operated such that the second dehydration means (step) yields dehydrated crop material having a dry-mass portion of at least 60%, and even better, of at least 70%. This dehydrated crop material is composed essentially of cellulose, regardless of the type of plant that was harvested.

A heat-treatment means (step) preferably is provided downstream of the second dehydration means (step). This heat-treatment means (step) may include, in particular, a thermochemical reactor for carbonizing the dehydrated crop material into gaseous and/or liquid and/or solid reaction products.

If, as mentioned above, a heating device is provided for heating the crop material that passes through the second dehydration means (step), the heat dissipated from this reactor may be used to supply the heating device.

The heat-treatment means (step) may also include a drying means (step). The drying means (step) may be used simply to obtain crop material that has been dehydrated further, thereby rendering it easy to haul and store; it may also take place upstream of the thermochemical reactor in order to supply it with highly dehydrated raw material for carbonization.

In order to dry the crop material obtained in the second dehydration means (step) quickly and efficiently, the drying means (step) may include means for adding a hot thermal transfer material to the crop material to be dried.

When the heat-treatment means (step) includes the reactor, the thermal transfer material is preferably a reaction product of the reactor. The reaction product generally leaves the reactor at a high temperature, and it is desirable to cool the reaction product before transferring it to a tank for storage.

The reactor generally yields gaseous, liquid, and/or solid reaction products, i.e. gas, oil, and/or coke. When gaseous reaction products, as the thermal transfer material in the drying means (step), are blown into the biomass to be dried, they mix with water vapour from the biomass, but they do not remain in the biomass to a noteworthy extent, thereby eliminating the need to use special devices for separating the reaction product from the biomass. It is also feasible to add solid reaction product (coke) to the mixture in order to heat the biomass. In this case, it is difficult to separate the two before they enter the reactor. In this case, the coke is simply returned to the reactor together with the fresh biomass.

The thermal transfer material that is added is preferably liquid (oil). This ensures that heat is transferred very rapidly and effectively from the thermal transfer material to the biomass via wetting and mixing.

In this case, a separation means (step)—provided in the form of a compressor, in particular—is preferably situated between the drying means (step) and the reactor in order to separate the oil from the biomass, and to remove the oil, as the yield of the process. It is therefore unnecessary to reheat the oil by passing it through the reactor once more. Only a remaining portion of the oil that was not removed in the separation means (step) passes through the reactor once more. Since this remaining portion does not become lost when it passes through the reactor, it is not necessary to place high requirements on the extent to which separation is carried out in the separation means (step).

Even if the heat treatment means (step) does not include the reactor, it is expedient to include the separation means (step) to remove the thermal transfer material, in order to recover it, reheat it, and transfer it to the drying means (step).

It may be advantageous to supply hydrogen gas to the reactor in order to reduce the content of oxygen remaining in the oil that is obtained, or to adjust the ratio of oxygen to carbon in the oil that is obtained, and, therefore, to adjust the length of its carbon chain to a desired value.

An electrolysis means (step), in which the aqueous portion that is removed in the dehydration device is electrolyzed, may be used to obtain the hydrogen.

A condensation means (step) is preferably provided in order to capture the reaction products that were released in the reactor as vapor. The condensation means (step) is also used to capture water that was carried in with the biomass or that was produced in the reactor, and that negatively impacts the quality of the condensate. In order to release a water-rich condensate obtained in the condensation means (step) from hydrocarbon portions, the condensate may be sent through a filter, to which coke obtained in the reactor may be added, as the filter material. In this manner, purified water may be deposited directly onto the field, as excess water from the mechanical dehydration means (step). The coke, which is saturated in the filter with organic components, may be sent to the reactor, directly or indirectly.

Gaseous reaction products, in particular those that remain after the passage through the condensation means (step) since they are non-condensable, are preferably used in the harvesting vehicle itself as energy carriers, in particular to heat the reactor.

A concentration means (step) which captures the aqueous portion that was removed in at least one of the dehydration means (step) may also be provided, in order to separate the aqueous portion into a portion that is enriched with dissolved substances, and into a portion from which dissolved substances were removed. While the enriched portion is generally collected in a tank of the harvesting vehicle for further processing, the portion from which dissolved substances were removed is preferably left on the field, as described above.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
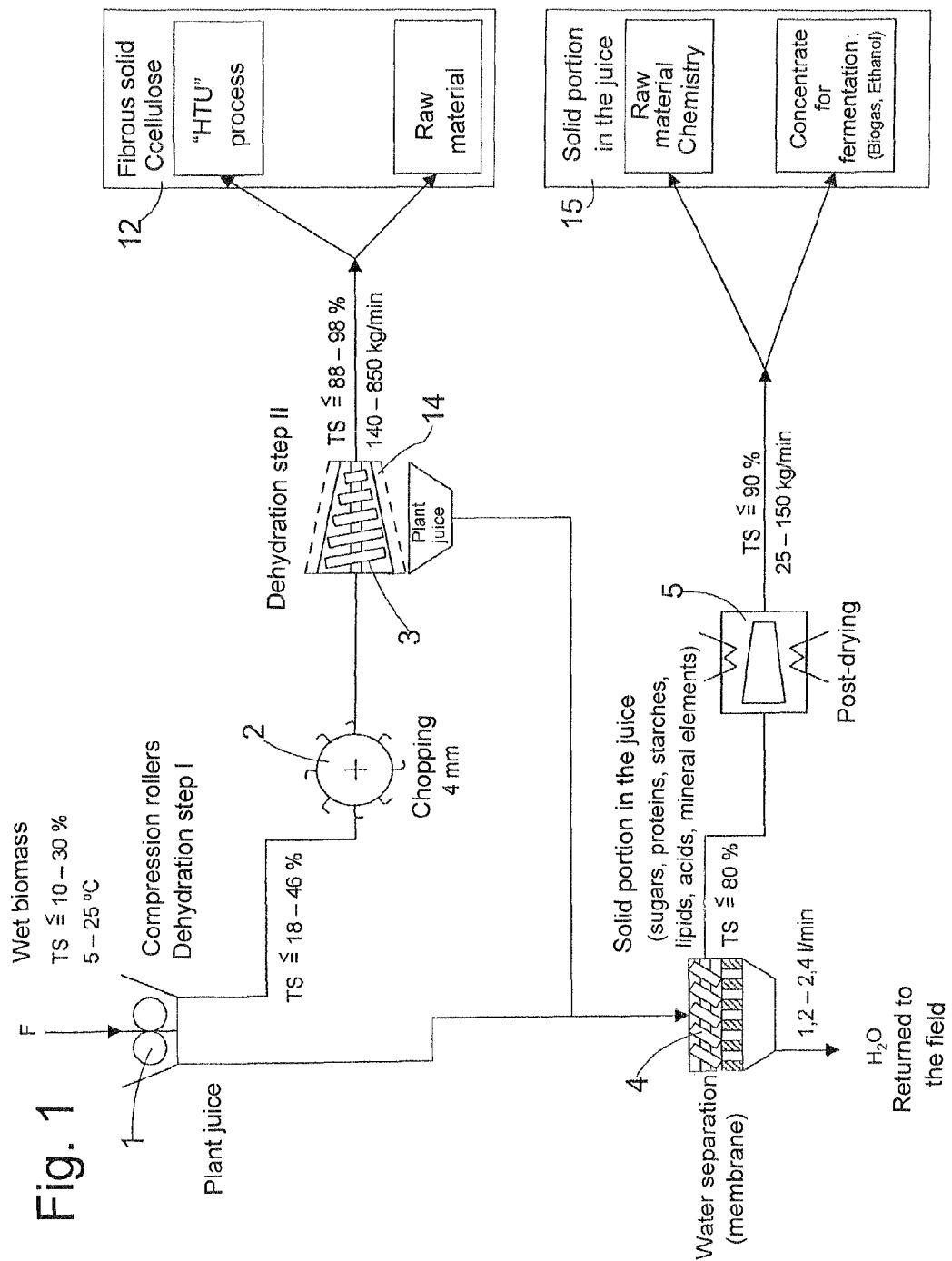
FIG. 1 is a view schematically showing processing devices of a harvesting vehicle of the present invention, with which a method of harvesting of the present invention is implemented, in accordance with a first embodiment of the invention.
Figure 2:
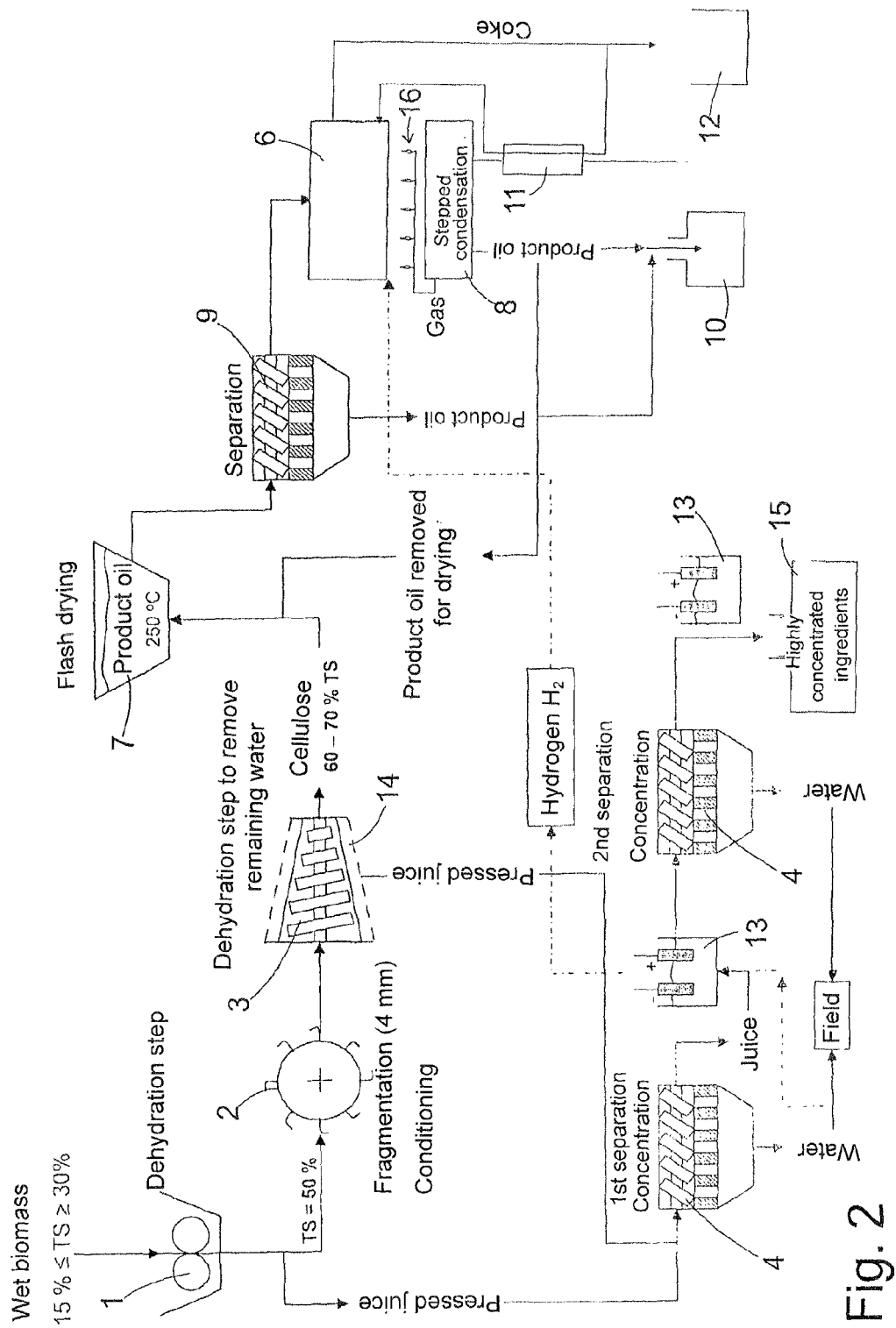
FIG. 2 is a view substantially corresponding to the view of FIG. 1, and showing the inventive harvesting vehicle and method in accordance with a second embodiment of the invention.

An external view of the harvesting vehicle according to the present invention is not shown, since its external design—provided it is not that of a conventional combine harvester or a forage harvester—depends essentially only on the requirement that the devices shown in FIGS. 1 and 2 be accommodated therein. Akin to a conventional forage harvester or combine harvester, the harvesting vehicle includes a ground drive, on the front of which a crop material pick-up device is mounted in a replaceable manner. The crop material pick-up device is identical to that of a conventional forage harvester or combine harvester, and it may be used in a replaceable manner thereon and on the harvesting vehicle according to the present invention.

The harvesting vehicle has a mechanical dehydration device which includes a first dehydration means performing a first dehydration step. The first dehydration means includes two compression rollers 1 which form a gap toward which the harvested biomass is conveyed by the pick-up device. Depending on the type of plant material involved, when the biomass passes through compression rollers 1, it loses approximately half of its water; while the portion of the dry mass in the freshly picked-up biomass is between 10% and 30%, the portion of dry mass that remains after the biomass passes through compression rollers 1 has increased to 18% to 46%.

The harvesting vehicle further includes a fragmentation means which performs a fragmentation step. The biomass which was pre-dehydrated using compression rollers 1 then passes through the fragmentation means formed as a chopping means 2 which, as in the case of a forage harvester, may include a rotating cutting roller and stationary knives which interact therewith. The fragmentation is more intensive than it is in the case of a forage harvester, e.g. due to the knives being placed more closely together, or due to the biomass remaining in chopping means 2 for a longer period of time, with the result that, when the material leaves the chopping means, particles having a typical maximum size of 4 mm are obtained.

The fragmentized material obtained in the chopping means (step) 2 is sent to a second dehydration means (performing a second dehydration step) of the mechanical dehydration device 3, e.g. a decanter or a sieve centrifuge. In conjunction with the intensive fragmentation, this makes it possible to increase the portion of dry mass to 88% to 98%. The fibrous, cellulose-rich solid material obtained in this manner, the mass of which now comprises only approximately 10% to 30% of the biomass that was originally picked up, is collected in a bunker 12 on board the vehicle. It has a much higher specific energy content than that of the fresh biomass, thereby making it cost-effective to transport it further to a stationary processing facility. Due to the reduction in weight, the route along which the dehydrated material may be transported in a cost-effective manner is three to ten times longer than it is in the case of fresh, non-dehydrated biomass. The surface area from which a central processing facility may be supplied in a cost-effective manner, and the income from material that may be processed in a cost-effective manner surrounding a facility of this type is therefore increased approximately 10 to 100-fold. This results in considerable economies of scale for the operation of the facility.

To improve the water-removal process in second dehydration means (step) 3, it may be provided that the biomass passes through the second dehydration means in the warmed state, e.g. by designing the walls themselves as heat exchangers 14, the walls being the walls which are in contact with the biomass and which belong to a conveyance path on which the biomass is conveyed between chopping means 2 and second dehydration means, or the walls of second dehydration means 3.

In the simplest case, the water that is removed in dehydration means 1 And dehydration means 3 could be deposited directly onto the field. It is expedient, however, to also remove any remaining components in a concentration means (step) 4 that are economically useful, such as sugars, proteins, starches, lipids, acids, or mineral elements, e.g. using a membrane filter or several filters of this type which are connected in series. Using known filtration technologies, it is possible in this manner to generate a flow which is enriched with valuable components and has a dry-mass portion of up to 80 per cent, the remainder being water from which the valuable components have been largely removed, the water being deposited onto the field.

In a post-drying means 5 (performing post-drying step), the portion of solid material in the enriched flow may be increased to up to 90 per cent. The concentrate which is obtained in this manner is collected in a tank 15 on-board the harvesting vehicle for further use, e.g. as feed, as a raw material for the chemical industry, or as a raw material for fermentation processes to create biogas or ethanol.

FIG. 2 shows an embodiment of the harvesting machine according to the present invention, in the case of which the processing carried out on-board the harvesting machine is more extensive than that carried out in the embodiment depicted in FIG. 1. Dehydration means 1, 3 which utilize compression rollers and a decanter or a centrifuge, chopping means 2 situated therebetween, and concentration means 4 for concentrating the valuable components in the pressed-out liquid are the same as those shown in the embodiment in FIG. 1.

A flash pyrolysis reactor 6 is also located on-board the vehicle; it is supplied with the dehydrated, solid material that was obtained from the fresh biomass and that is composed mainly of cellulose. This material is heated in reactor 6 in the absence of air, thereby converting it in a continual process into water, various hydrocarbons, and a residual portion of solid material that is composed essentially of carbon, and is referred to as coke. The reaction products that are released as gas at the high temperature of reactor 6 are sent to a condensation means (step) and are condensed into fractions having a different boiling point. In condensation means 8, non-condensable gas supplies burner 16 which heats reactor 6.

Fractionated condensation takes place in condensation means (step) 8; parameters of the fractionation are defined such that a fraction essentially contains all of the water that entered reactor 6 with the biomass and that was created via the pyrolysis reactions that took place therein, while at least one further fraction which is referred to as product oil is composed essentially only of hydrocarbons. If product oil is obtained, it passes through heat exchanger 14—which was mentioned with reference to FIG. 1—of the decanter or centrifuge 3—into a tank 10, except for a portion, preferably a fraction that condenses at a high temperature, which is redirected in entirety or partially to condensation means 8 so that it may be added in a drying means (step) 7 to the dehydrated biomass obtained in second dehydration means (step) 3. Drying means 7 may include kneading or stirring tools to mix the oil with the dehydrated biomass. The high temperature of the product oil causes the moisture remaining in the biomass to evaporate, thereby making it possible to remove a mixture of product oil and essentially anhydrous biomass at the outlet of post-drying means (step) 7.

Before this mixture reaches reactor 6, it passes through a separation means (step) 9 in which the product nil is removed from the biomass under pressure. The product oil which is removed in this manner is collected in tank 10 along with the portion of product oil that was obtained in condensation step 8 and that was not sent to drying means (step) 8.

According to a preferred development, a filter 11 is provided in order to clean the condensate fraction that was obtained in condensation means (step) 8 and that is composed essentially of water. As the filter substrate, filter 11 uses a portion of the coke from reactor 6 which is conveyed continually through filter 11 in the counter-flow to the aqueous fraction, thereby saturating the aqueous fraction with the organic components. The water that is obtained via filtration may be deposited onto the field if necessary, after undergoing a postcleaning means (step); the coke that is saturated with the organic portions may be collected together with the remaining coke from reactor 6 in a bunker 12, as the combustible material, or, depending on the extent of its saturation with water or organic material, it may be returned directly to reactor 6, as shown in FIG. 2, or it may be returned by the long route via drying means (step) 7, to remove the organic components via distillation in reactor 6 and add them to the product oil.

According to another development of the present invention, an electrolysis cell 13 is provided, which is supplied with the enriched portion obtained in concentration means and step 4. Electrolysis cell 13 is supplied with frequency-modulated direct current in order to obtain a high yield of hydrogen using a reduced amount of energy. The hydrogen obtained via electrolysis is supplied to pyrolysis reactor 6. The increase in the hydrogen supply in reactor 6 attained in this manner improves the conversion of the oxygen bound in the biomass to water, thereby yielding an oil from the flash pyrolysis that contains less oxygen and is therefore of higher quality.

It will be understood that each of the elements described above, or two or more together, may also find a useful application in other types of constructions and methods differing from the types described above.

While the invention has been illustrated and described as embodied in a self-propelled harvesting vehicle for crop material and method of harvesting for technical use, it is not intended to be limited to the details shown, since various modifications and structural changes may be made without departing in any way from the spirit of the present invention.

Without further analysis, the foregoing will so fully reveal the gist of the present invention that others can, by applying current, knowledge, readily adapt it for various applications without omitting features that, from the standpoint of prior art, fairly constitute essential characteristics of the generic or specific aspects of this invention.

The invention claimed is:

1. A self-propelled harvesting vehicle, comprising
a crop material pick-up device;
a fragmentation means for fragmenting the crop material;
a mechanical dehydration device for removing an aqueous portion of the crop material, said mechanical dehydration device including a first dehydration means that is located upstream of said fragmentation means and a second dehydration means that is located downstream of said fragmentation means; and
a heat-treatment means provided downstream of said second dehydration means;
wherein said heat-treatment means includes a thermochemical reactor for carbonizing a dehydrated crop material into reaction products selected from the group consisting of gaseous reaction products, liquid reaction products, solid reaction products, and combinations thereof.

2. The self-propelled harvesting machine as defined in claim 1, wherein said heat-treatment means includes a drying means.

3. The self-propelled harvesting machine as defined in claim 2, wherein said drying means includes a means for adding hot thermal transfer material to the crop material to be dried.

4. The self-propelled harvesting machine as defined in claim 3, wherein said means for adding hot thermal transfer material is configured for adding the thermal transfer material which is a reaction product of the thermochemical reactor.

5. The self-propelled harvesting machine as defined in claim 3, further comprising a separation means for separating the added thermal transfer material from the dried crop material downstream of the drying means.

6. The self-propelled harvesting machine as defined in claim 5, wherein said separating means is located upstream of the reactor.

7. The self-propelled harvesting machine as defined in claim 1, further comprising means for supplying hydrogen gas into the reactor.

8. The self-propelled harvesting machine as defined in claim 7, further comprising an electrolysis means for obtaining hydrogen via electrolysis from the aqueous portion that was separated out in the dehydration device.

9. The self-propelled harvesting machine as defined in claim 1, further comprising a condensation means for condensing vaporous products of the reactor and removing an aqueous condensate; and a filter through which the aqueous condensate flows, and to which coke from the reactor is added as a filter material.

10. The self-propelled harvesting machine as defined in claim 9, further comprising a burner for heating the reactor and supplied with gaseous reaction product from the reactor.

11. The self-propelled harvesting machine as defined in claim 1, further comprising a concentration means which captures the aqueous portion that was removed in at least one of the dehydration means for separation into a portion that is enriched with dissolved substances, and into a portion from which the dissolved substances have been removed.

12. The self-propelled harvesting vehicle as defined in claim 11, further comprising a collection tank provided for the enriched portion.

13. A method of harvesting a crop material with a self-propelled harvesting vehicle comprising the steps of
picking-up a crop material with a pick-up device;
fragmenting the crop material with a fragmentation means;
removing an aqueous portion of the crop material with a mechanical dehydration device including a first dehydration means located upstream of the fragmentation means and a second dehydration means located downstream of the fragmentation means;
heating the crop material that passes through the second dehydration means by a heating device; and
providing a heat-treatment by a heat-treatment stage located downstream of the second dehydration stage;
wherein the heat-treatment means include a thermochemical reactor for carbonizing a dehydrated crop material into reaction products selected from the group consisting of gases, reaction products, liquid reaction products, solar reaction products, and combinations thereof.

14. A method of harvesting a crop material as defined in claim 13, further comprising delivering dehydrated crop material by the second dehydration means, having a dry-mass portion of at least 60%.

15. A method of harvesting a crop material as defined in claim 13, further comprising dehydrating by the dehydration device the crop material composed substantially of cellulose.

16. A method of harvesting a crop material as defined in claim 13, further comprising including a drying means into the heat-treatment stage.

17. A method of harvesting a crop material as defined in claim 16, further comprising including in the drying means a means for adding hot thermal transfer material to the crop material to be dried.

18. A method of harvesting a crop material as defined in claim 17, further comprising configuring the means for adding the thermal transfer material which is a reaction product of the thermal chemical reactor.

19. A method of harvesting a crop material as defined in claim 17, further comprising separating the added thermal transfer material from the dried crop material downstream of the drying means by a separation means.

20. A method of harvesting a crop material as defined in claim 19, further comprising locating the separating means upstream of the reactor.

21. A method of harvesting a crop material as defined in claim 13, further comprising supplying hydrogen gas into the reactor by a hydrogen gas supplying means.

22. A method of harvesting a crop material as defined in claim 21, further comprising obtaining hydrogen in an electrolysis means via an electrolysis from the aqueous portion that was separated out in the dehydration device.

23. A method of harvesting a crop material as defined in claim 13, further comprising condensing vaporous products of the reactor in a condensation means and removing an aqueous condensate; and providing a filter through which the aqueous condensate flows and to which coal from the reactor is added as a filter material.

24. A method of harvesting a crop material as defined in claim 23, further comprising heating the reactor by a burner and supplying the burner with gaseous reacting product from the reactor.

* * * * *